United States Patent [19]

Olson

[11] 4,380,938
[45] Apr. 26, 1983

[54] COMBINATION TRANSMISSION GEAR SELECTOR VALVE FOR AUTOMOTIVE VEHICLES

[75] Inventor: Paul E. Olson, Lexington, Ky.

[73] Assignee: American Standard Inc., Lexington, Ky.

[21] Appl. No.: 243,156

[22] Filed: Mar. 12, 1981

[51] Int. Cl.³ .............................................. G05G 9/00
[52] U.S. Cl. .................................. 74/473 R; 74/491; 74/523; 251/229; 251/231
[58] Field of Search ............. 74/473 R, 471 XY, 491, 74/523; 251/205, 208, 229, 231

[56] References Cited
U.S. PATENT DOCUMENTS

| | | | |
|---|---|---|---|
| 2,398,243 | 4/1946 | Morse | 74/473 R |
| 3,940,674 | 2/1976 | Hill | 74/471 XY X |
| 3,941,009 | 3/1976 | Brown | 74/473 R |
| 3,975,970 | 8/1976 | Elfes et al. | 74/473 R |
| 3,979,967 | 9/1976 | Dunlap | 74/475 |
| 4,012,014 | 3/1977 | Marshall | 74/471 XY X |

Primary Examiner—Kenneth Dorner
Assistant Examiner—Frank H. McKenzie, Jr.
Attorney, Agent, or Firm—R. S. Visk

[57] ABSTRACT

A transmission gear selector valve for automotive vehicles combining a range valve, normally strapped on the side of a gear shift lever, and a splitter valve, normally mounted on the gear shift lever in place of the knob, into a single valve assembly, which provides a single valve assembly mountable on the gear shift lever in place of the knob.

6 Claims, 4 Drawing Figures

COMBINATION TRANSMISSION GEAR SELECTOR VALVE FOR AUTOMOTIVE VEHICLES

BACKGROUND OF THE INVENTION

In present arrangements for providing multi-gear ratios for automotive transmissions, such as for trucks, a high-low range valve is strapped to the manual gear shifting lever, while a splitter valve is mounted in place of the gear shift lever knob. Such an arrangement requires two separate valve devices which must be mounted individually. Such arrangement is, therefore, costly to provide and install.

SUMMARY OF THE INVENTION

The object of the present invention, therefore, is to provide a gear selector valve assembly combined into a single unit mountable by one operation.

Briefly, the invention comprises a single unit valve assembly including both the high-low range valve and the splitter valve, said valve assembly being mountable on the gear shift lever in place of the knob at the top of the lever. The valve assembly also provides a simplified sealing arrangement comprising a single O-ring sealingly surrounding several ports at one time for making several communications in one position of the selector valve, instead of individual O-rings for each port.

DESCRIPTION AND OPERATION

Figure 3:
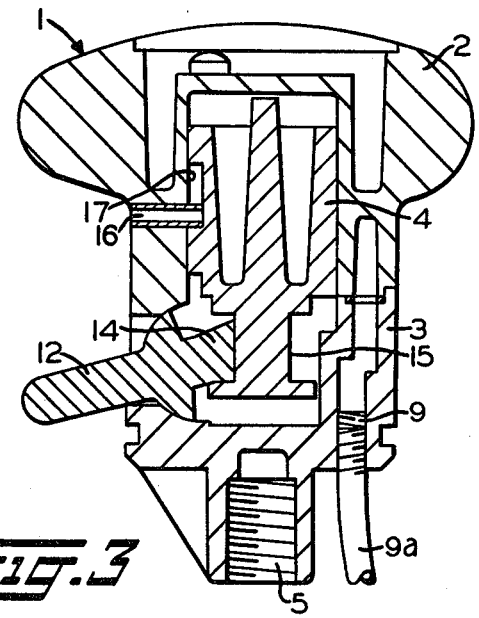
FIG. 3 is an elevational view, in section, taken along line III—III of FIG. 2 as viewed in the direction of the arrows.
Figure 2:
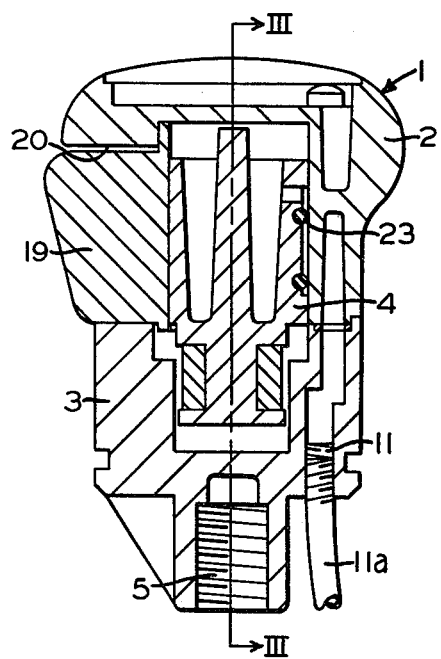
FIG. 2 is an elevational view, in section, of the valve assembly shown in FIG. 1, taken along line II—II of FIG. 1 as viewed in the direction indicated by the arrows.
Figure 4:
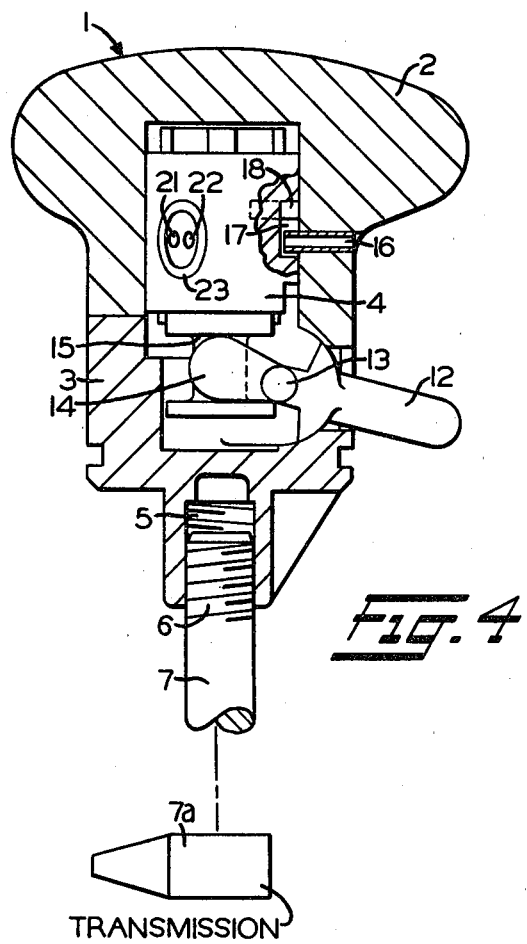
FIG. 4 is an elevational view, in section, taken along line IV—IV of FIG. 1 as viewed in the direction of the arrows.

As shown in FIGS. 2 through 4, a selector valve housing 1 comprises an upper or splitter valve portion 2 and a lower or base portion 3. A vertically axially movable valve element 4 is operably disposed in housing 1, which is mounted by screw threads 5 on screw threads 6 formed at the top end of a manual gear shift lever 7 (see FIG. 4) for operating a transmission 7a (shown symbolically in FIG. 4) of an automotive vehicle (not shown).

Figure 1:
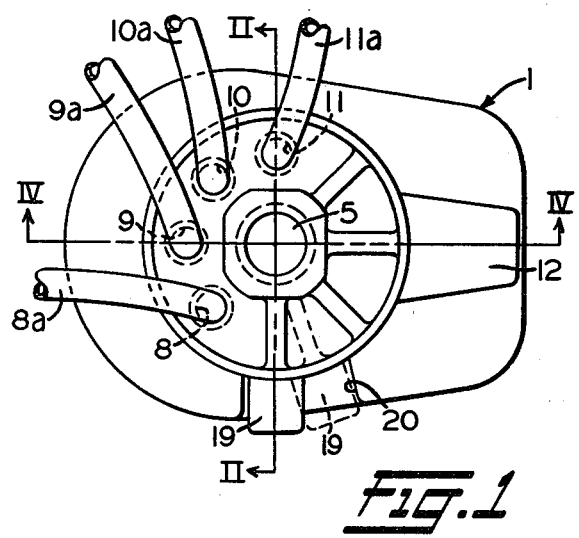
FIG. 1 is a bottom plan view of the combination selector valve assembly embodying the invention.

Ports 8, 9, 10, and 11 may be seen in FIG. 1 opening to the bottom of selector valve housing 1. Port 8 is an exhaust port having one end of a tubing 8a connected thereto and leading to atmosphere outside the vehicle cab (not shown); range port 9, when in operation, has one end of a tubing 9a connected thereto with the other end of the tubing connected to the vehicle transmission 7a for selecting either a high or low range of gear ratios of the transmission, as will hereinafter be explained; supply port 10 has one end of a tubing 10a connected thereto while the other end is connected to a source of fluid under pressure such a storage reservoir (not shown); splitter port 11 has one end of a tubing 11a connected thereto with the other end of said tubing connected to the transmission 7a of the vehicle.

Valve element 4 is vertically axially movable by a range lever 12 which is pivotally mounted about a pin 13 fixed in base portion 3 of housing 1. Range lever 12 has a cam portion 14 engaging an annular groove 15 (see FIG. 4) formed on the lower end of valve element 4. In a "down" position of lever 12, valve element 4 occupies a low range position in which fluid pressure supply is connected via port 9 and tubing 9a to the transmission 7a for effecting operation thereof, in conventional manner, to a low range disposition in which the shift lever 7 may be manually operated, in conventional manner, to select one of five forward speeds or reverse.

If range lever 12 is moved upwardly to an "up" position, valve element 4 is shifted downwardly to a high range position in which fluid pressure or the range signal is vented from the transmission to atmosphere via tubing 8a and port 8. The transmission 7a, therefore assumes, in conventional manner, a high range disposition in which gear shift lever 7 may be manually operated, in conventional manner to one of four forward speeds or reverse.

In the high range disposition of transmission 7a, all the forward speeds are proportionally higher than those of the low range, and "splitter" means is provided whereby each of the forward speeds in the high range may be further split into two speeds by rotating valve element 4 to a plurality of angular positions as will be explained. A pin 16 is horizontally fixed in upper housing portion 2 so as to have its inner end projecting into a vertical slot 17 formed in valve element 4. Thus when valve element 4 is in its upper or low range position, valve element 4 is locked in a non-rotatable position. When lever 12 is shifted upwardly to cause valve element 4 to be shifted downwardly to its high range position, the end of pin 16 registers with a horizontally disposed arcuate groove 18 formed in valve element 4 (see FIG. 4) so that said valve element is thus free to be rotated angularly between the angular limits of said groove.

A "splitter" tab 19 is secured to valve element 4 and projects outwardly of upper housing portion 2 through a side opening 20 formed in said housing (see FIGS. 1 and 2). Splitter tab 19 is angularly movable to cause angular rotation of valve element 4 to one of two positions so as to either communicate supply port 10 to the transmission 7a via splitter port 11 and tubing 11a in one of said two positions, or connect said splitter port to exhaust port 8 in the other of said two positions. Thus in each position of gear shift lever 7, the splitter tab 19 may be operated to increase or decrease the gear ratio of the speed selected by said gear shift lever.

As above described, only two selected ports of ports 8 through 11 are communicated with each other at any given time, such as range port 9 being connected with exhaust port 8, for example. Such communications are effected via passageways (not shown) formed in body portion 2 and valve element 4 and registering via a pair of communicating ports 21 and 22 formed in and opening to the outer surface of said valve element. In accordance with the invention, a single sealing ring 23 is disposed in the outer surface of valve element 4 so as to make sealing contact with the inner surface of valve body portion 2. The diametral dimension of sealing ring 23 is such that it encompasses the area within which the registering openings are disposed. Such an arrangement eliminates the necessity of having respective O-rings surrounding each of the registering ports. Moreover, such an arrangement insures the integrity of an air-tight connection.

Having now described the invention, what I claim as new and desire to secure by Letters Patent, is:

1. A transmission gear selector valve device for automotive vehicle transmissions having a gear shift lever having a free end by which the lever may be manually operated to a plurality of positions for selecting one of a plurality of forward speed ratios or reverse speed ratios of the transmission of said gear selector valve device comprising:
   (a) a housing including an upper portion and a base portion secured together to form a single housing unit removably carried on said free end to act as a knob for the gear shift lever;
   (b) a valve means reciprocably operable in said housing between a low range position, to adjust the transmission to a low gear ratio disposition, and a high range position, to adjust the transmission to a high gear ratio disposition; and
   (c) a manually operable lever connected to said valve element for effecting selective operation thereof to either its said low range or high range positions.

2. A transmission gear selector valve device, as set forth in claim 1, wherein said gear shift lever, in the high range position of the valve means, may be selectively operated to select one of said forward speed ratios, said gear selector valve device being further characterized by a splitter valve means operable for dividing the selected gear ratio into a pair of different gear ratios.

3. A transmission gear selector valve device, as set forth in claim 1, further characterized by a range lever pivotally anchored in said base portion of said housing and having formed at one end a cam engaging an annular groove formed on said valve means, said lever being pivotally operable to a first position for operating said valve means to its said low range position, and being operable to a second position for operating said valve means to its said high range position.

4. A transmission gear selector valve device, as set forth in claim 3, wherein said valve housing includes a plurality of ports connected respectively to the splitter valve means, to a fluid pressure source, to the vehicle transmission, and to an atmospheric exhaust port, and wherein said valve means is also provided with a pair of ports communicating with each other, said valve means, when in its high range position, being angularly operable to one of a plurality of positions for placing said pair of ports in registry with a selected pair of said ports in the housing for effecting communication therebetween and the respective disposition of the transmission.

5. A transmission gear selector valve device, as set forth in claim 4, further characterized by a splitter tab secured to said valve means for rotating the valve means to a splitter position in which the transmission is operated to either a higher or lower gear ratio.

6. A transmission gear selector valve device, as set forth in claim 4, wherein said valve means is provided with a sealing element disposed on the outer surface thereof and of such dimension as to encompass said pair of ports in the valve means and the ports in the housing registering therewith in an air-tight seal.

* * * * *